United States Patent [19]
Crawford et al.

[11] Patent Number: 5,883,625
[45] Date of Patent: *Mar. 16, 1999

[54] ARRANGEMENT SYSTEM FOR OBJECT PLACEMENT ON WINDOWS

[75] Inventors: Chris Crawford, Forth Worth; Douglas Bonser, Irving, both of Tex.

[73] Assignee: AST Research, Inc., Irvine, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 635,719

[22] Filed: Apr. 22, 1996

[51] Int. Cl.$^6$ ........................................ G06F 15/00
[52] U.S. Cl. ........................................ 345/340; 345/339
[58] Field of Search ........................ 395/333, 326, 395/334, 335, 339, 340, 342, 117; 345/326, 356

[56] References Cited

U.S. PATENT DOCUMENTS

| | | | |
|---|---|---|---|
| 5,434,964 | 7/1995 | Moss et al. | 395/342 |
| 5,448,693 | 9/1995 | Blades et al. | 395/348 |
| 5,515,495 | 5/1996 | Ikemoto | 395/340 |
| 5,544,301 | 8/1996 | Orton et al. | 395/340 |
| 5,577,187 | 11/1996 | Mariani | 395/342 |
| 5,604,856 | 2/1997 | Jefferson et al. | 395/342 |
| 5,717,877 | 2/1998 | Orton et al. | 345/326 |
| 5,721,848 | 2/1998 | Joseph | 345/339 |

*Primary Examiner*—Steven P. Sax
*Attorney, Agent, or Firm*—Knobbe, Martens, Olson & Bear, LLP

[57] ABSTRACT

A system and method for automatically arranging objects inside a container of a graphical user interface in a visually attractive and effective manner. In a departure from the art, selectable grid styles are provided for arranging cells into different configurations inside the container. Depending on the grid style available, the cells may be placed in any one of many different grid styles, such as rectangular, rhombus-shaped, or circular. Furthermore, identifiers are utilized for placing objects such as icons or buttons in each cell and ordering the objects for other user applications. In this way, different grid styles can be utilized and/or easily changed and new grid styles can easily be added.

32 Claims, 3 Drawing Sheets

ARRANGEMENT SYSTEM FOR OBJECT PLACEMENT ON WINDOWS

TECHNICAL FIELD

The invention relates generally to user interfaces for computers and, more particularly, to a configurable grid-type system for automatically arranging objects inside a container of a graphical user interface.

BACKGROUND OF THE INVENTION

Graphical user interfaces, or "GUIs" as they are often designated, have become an increasingly common and popular feature of computers, especially personal computers (PCs). One of the many advantages of such GUIs is that they allow a user to enter commands by selecting and manipulating objects such as icons or buttons, usually with a pointing device, such as a mouse. The objects of a GUI are designed to look and behave in a manner similar to the files or applications they represent. The Apple Macintosh user interface and Microsoft Windows operating environment are two common and very popular examples of GUIs, illustrating the fact that the advantages of GUIs over conventional text-based user interfaces are widely recognized.

GUIs store objects in containers. There are many different types of containers, including "desktops", "files", "groups", and many different application programs. A typical container includes a window so that a user may "see" some or all of the objects stored therein. Conventionally, the GUI arranges the objects inside the container using one of two methods. The first is a free-form method, in which an object may be placed anywhere inside the container. Utilizing this method, the GUI places an object in a random location inside the container, and the user may reposition the object to any other location by moving it using conventional techniques. The second method is a snap-to-grid method in which a discrete number of locations, or cells, in which an object may reside are defined inside the container. Utilizing this method, the GUI arranges the cells in a rectangular grid style and places an object in an unoccupied cell. If the user repositions the object outside of one of the cells, the GUI "snaps" the object into the nearest available cell, thereby maintaining a neat and rectangular grouping of the objects.

Several disadvantages are associated with each of the above described arrangement methods. For example, the free-form method often results in a container that appears disorderly, with objects overlapping and/or unevenly spaced apart. In addition, some objects can seem to disappear. This often happens when objects overlap in such a manner that one object completely covers another object.

The snap-to-grid method solves many of the problems associated with the free-form method. It prevents objects from overlapping and keeps the objects in a rectangular, evenly spaced order. It also allows new objects to be added in a symmetrical format. However, neither the free-form method nor the snap-to-grid method allows objects to be easily arranged in an irregular grid style, such as a rhombus or circle, while keeping the overall symmetrical ordering of all the objects. Furthermore, neither method provides an easy way to rearrange the objects into a different grid style without extensive user interaction.

Therefore, what is needed is a system and method for automatically arranging objects such as icons or buttons of a container in a visually attractive and effective manner.

SUMMARY OF THE INVENTION

The present invention, accordingly, provides a system and method for automatically arranging objects inside a container of a graphical user interface in a visually attractive and effective manner. In a departure from the art, selectable grid styles are provided for arranging cells into different configurations inside the container. Depending on the grid style available, the cells may be placed in any one of many different grid styles, such as rectangular, rhombus-shaped, or circular. Furthermore, identifiers are utilized for placing objects such as icons or buttons in each cell and ordering the objects for other user applications. In this way, different grid styles can be utilized and/or easily changed and new grid styles can easily be added.

A technical advantage achieved with the invention is that it streamlines the process of configuring objects for a variety of grid styles, while maintaining the visually attractive elements thereof.

A further technical advantage achieved with the invention is that it allows a user to customize a container by selecting from different grid configurations.

DESCRIPTION OF THE PREFERRED EMBODIMENTS

Figure 1:
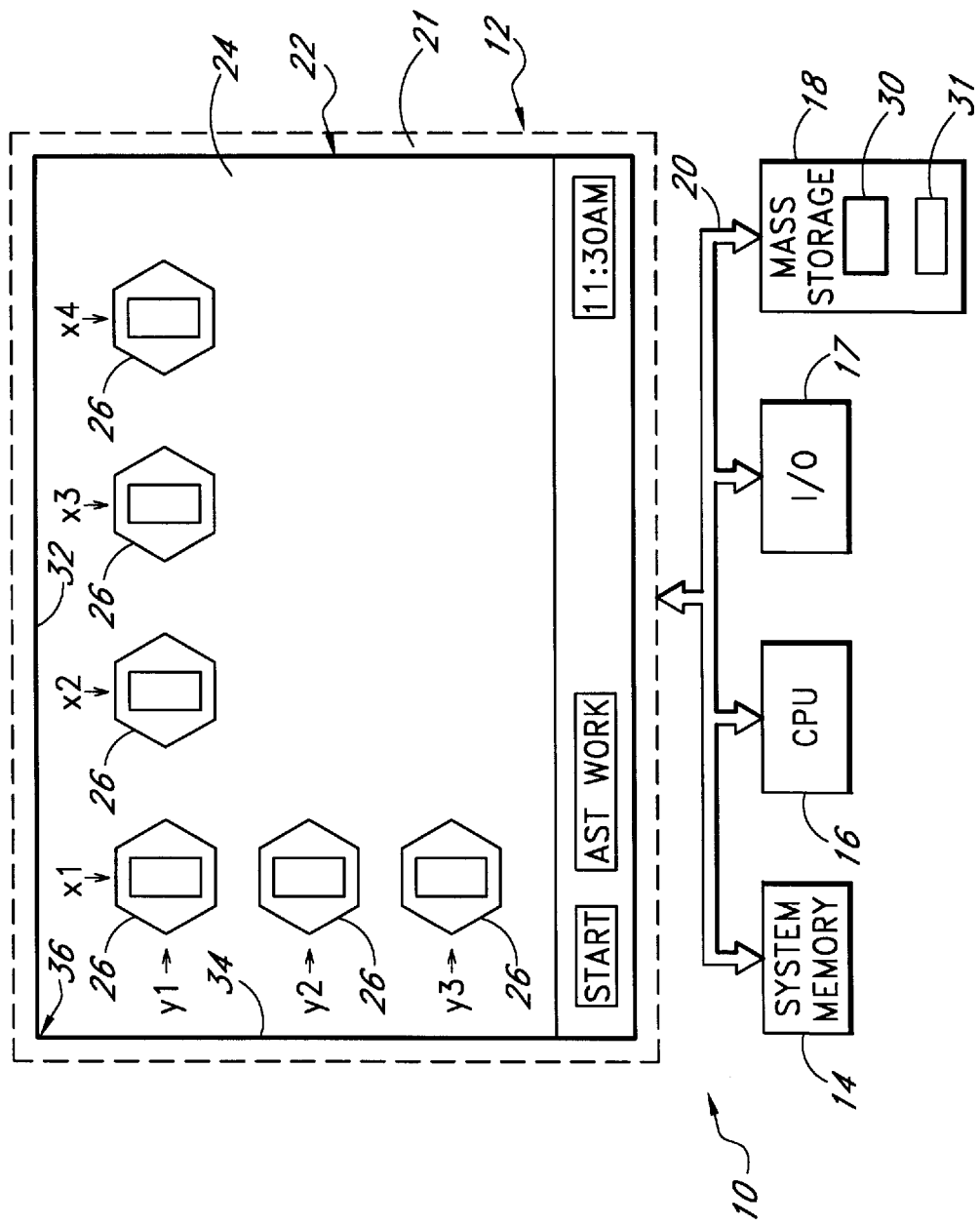
FIG. 1 is a system block diagram of a computer for utilizing the present invention and a display with a first grid style implemented thereon.

FIG. 1 is a system block diagram of a computer 10 embodying features of the present invention. The computer 10 comprises a display 12, a system memory 14, a CPU 16, an I/O device 17 and a mass storage device 18 interconnected via one or more computer buses, such as a system bus 20. Shown on the display 12 is a graphical user interface (GUI) 21 including a container 22. Furthermore, the container 22 includes a window 24, and a plurality of objects 26 inside the container for representing a plurality of related items.

In the illustrated embodiment, the GUI 21 represents a desktop view of Microsoft Corporation's Windows 95 GUI operating system and the container 22 and objects 26 are implemented using AST's ASTWorks utility application program. However, it is anticipated that the system of the present invention may be implemented in any number of different GUI operating systems and containers. Moreover, although all the objects 26 are shown in the figures as having similar dimensions and shapes, in an alternative embodiment, the dimensions of the objects 26 may be varied, thereby enabling the manufacturer or user of the computer 10 to increase the visual appeal of the objects.

As will be described in greater detail with regards to FIGS. 1–3, a grid style for the container 22, as seen through the window 24, is customizable to provide different attractive visual arrangements of the objects 26. The grid styles described herein are representative of just a sample of the many grid styles that can be implemented. The only requirement for a grid style is that a formula can be derived to define locations for cells inside the container 22. Therefore, grid styles can be almost any shape, and the grid styles described herein merely represent the flexibility of the present invention, and are not intended to limit it to certain styles.

As will be described thereafter and with reference to FIG. 4, the objects 26 inside the container 22 are dynamically arranged, based on the grid style selected, during setup of the computer 10 and during any subsequent user changes to the grid style. This is accomplished using a program 30 and a grid record 31, both stored on the mass storage device 18. In addition, it is a feature of the present invention to automatically reconfigure the arrangement of the objects 26 inside the container 22, depending on the grid style chosen, so that they are arranged in a clean and orderly manner.

FIG. 1 illustrates an example of a first grid style for the container 22. The program 30 arranges the cells inside the container 22 in a rectangular grid style that is visually identical to the conventional snap-to-grid method described earlier. The rectangular grid style defines a plurality of cell locations, relative to an origin location 36. The cells are arranged in rows y1, y2, y3 which run parallel with a. top edge 32 of the window 24 and columns x1, x2, x3, x4 which run parallel with a side edge 34 of the window.

Figure 2:
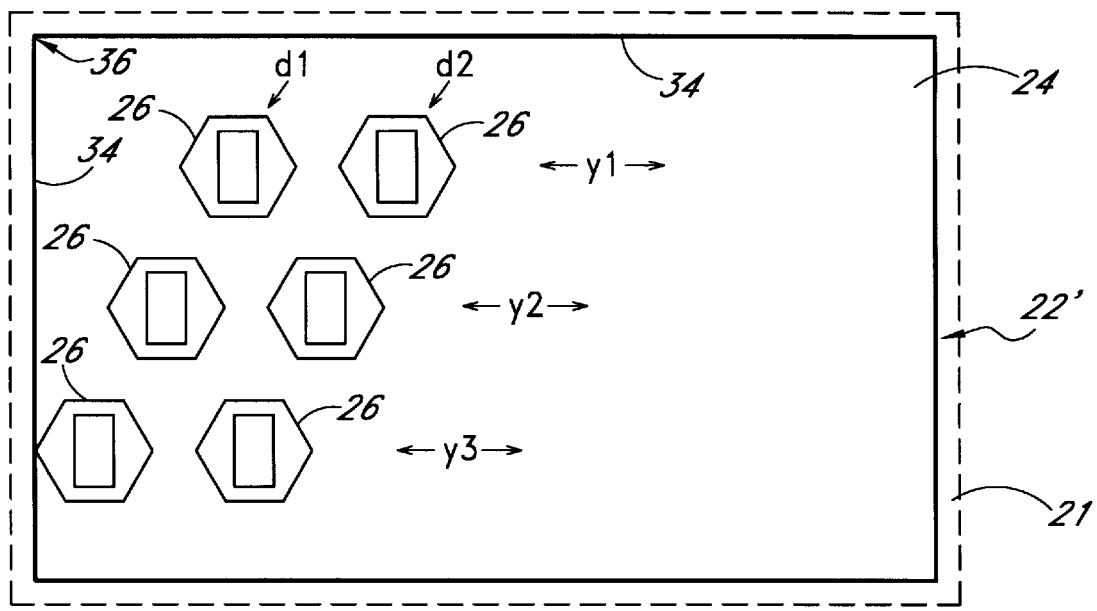
FIG. 2 is the display of FIG. 1 with a second grid style implemented thereon.

FIG. 2 illustrates an example of a second grid style for the container 22. The program 30 arranges the cells inside the container, designated by a reference numeral 22', in a rhombus grid style. The container 22' is similar in all respects to the container 22, except for the arrangement of the cells. In this embodiment, the cells are still arranged in rows y1, y2, y3 parallel with the top edge 32, relative to the origin location 36. However, instead of arranging the cells in vertical columns parallel with the side edge 34, the cells are arranged in diagonal columns d1, d2. In this way, when the objects 26 are placed inside their corresponding cells, they are placed in an attractive and orderly arrangement that is different from the rectangular style described in FIG. 1.

Figure 3:
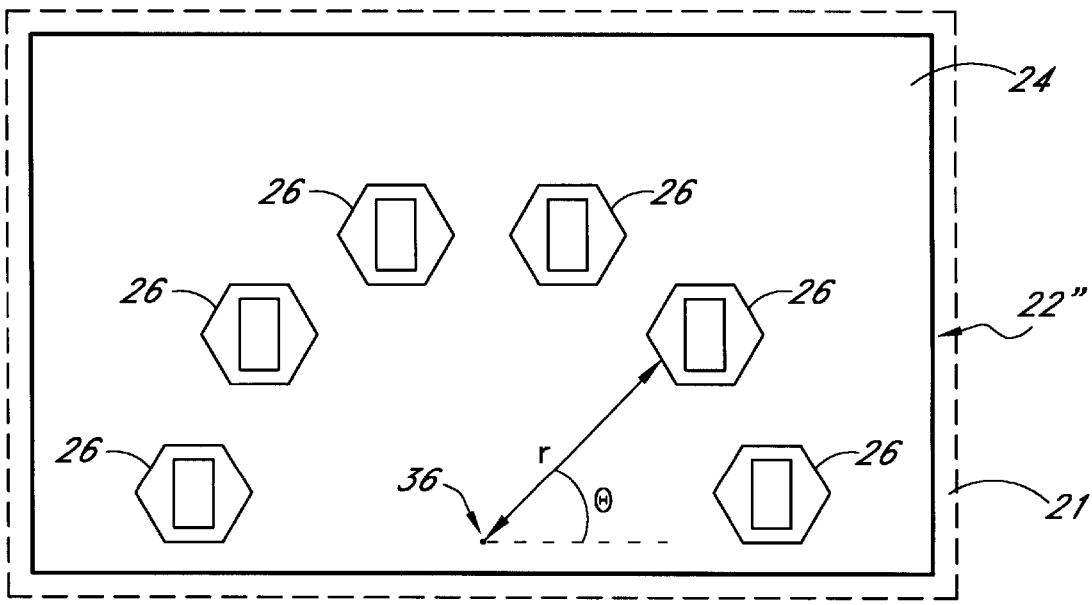
FIG. 3 is the display of FIG. 1 with a third grid style implemented thereon.

FIG. 3 illustrates an example of a third grid style for the container 22. The program 30 arranges the cells inside the container, designated by a reference numeral 22", in a circular grid style. The container 22" is similar in all respects to the containers 22 and 22', except for the arrangement of the cells. In this embodiment, the cells are spaced from an origin 36 by a radius r, and radially spaced from the origin 36 by angular offsets, such as offset $\Theta$. In this way, when the objects 26 are placed inside their corresponding cells, they are placed in an attractive and orderly arrangement that is different from the rectangular and rhombus styles described in FIGS. 1 and 2.

Referring again to FIG. 1, to accomplish the different grid styles, the program 30 works primarily with the container 22, the grid record 31 and the objects 26. Software code used to create the container 22 remains unchanged by any operations of the program 30. Instead, only the appearance of the container changes, due to the different arrangements of the objects 26. As a result, the present invention works well with virtually any type of container 22.

The grid record 31, stored with the program 30 inside the mass storage device 18, contains several items, including the grid style. Changing the grid style can be accomplished in many different ways. Using the Windows95 example, a grid style menu can be included in a CONTROL PANEL utility application to list the different grid styles available. In this way, the user can simply access the CONTROL PANEL utility application and alter the grid style, similar to the conventional method for changing a background color for the container 22. Including a menu in the CONTROL PANEL utility application of Windows95 is well known in the art and will not be further discussed. Also, the grid style menu can be included in many different applications, and the CONTROL PANEL application is discussed merely for the sake of example.

The grid record 31 also includes a pointer list, a placement identifier list and a logical identifier list. The pointer list is used to reference all the objects that are to be displayed inside the container. This list will be discussed in greater detail with reference to FIG. 4. The placement identifier list and logical identifier list contain a plurality of placement identifiers and logical identifiers, respectively, which are unique for each cell. As will be discussed in greater detail below, any particular cell denoted by the grid record 31 can be referenced using either its corresponding placement or logical identifier.

The placement identifier is an ordinal number defining a particular cell in which an object 26 will reside, with respect to the origin 36. Furthermore, the placement identifier is independent of the grid style. In this way, when a new object 26 is added, the program 30 can correctly place the new object into a cell that does not already contain an object by perusing the placement identifier list for the next available cell, and does not have to be concerned with which grid style is in use.

Each object 26 corresponds to a unique cell by storing a copy of the cell's placement identifier within the object. In the Windows95 example, the copy of the placement identifier is stored in a persistent information code of the object. The persistent information code, or properties, of the object 26 is well known in the art, and has functional equivalents in other GUIs. Therefore, a method used to store the copy of the placement identifier with the object 26 will not be further discussed. Because the placement identifier is stored with the object 26, the object can query the grid record 31 for the cell it should occupy. Also, since the placement identifier is independent of grid style, when the grid style is changed., no change is required of the placement identifier or of the persistent information record of any object 26.

The logical identifier is a coordinate associated with the location of each cell inside the particular grid style and with a corresponding placement identifier. For example, if the grid style is rectangular, the logical identifier is an element of a straight forward, two-dimensional x-y coordinate system. If the grid style is circular, the logical identifier is an element of a two-dimensional $\Theta$ polar coordinate system. Therefore, the objects 26 can be arranged in many different; grid styles, the only requirement being that the logical identifier can represent the different cell locations.

The logical identifiers are stored in the logical identifier list of the grid record. Furthermore, the logical identifier list is in a specific order. The order of the logical list is not determined by the grid style coordinate system, but is determined by other factors, such as a user-specified order or the program 30 may order the list with the most commonly used objects first. For example, in the rectangular grid style, the logical list does not have to order each cell location sequentially across each row, or down each column. Instead, the logical identifier list can be of any order, as long as each logical identifier is included only once. In so doing, the logical identifier can be used for user-based operations, such as tabbing from one object to another. The logical identifier list itself can also be queried to provide less than/ greater than arguments between two logical identifiers. Finally, since each logical identifier corresponds with a placement identifier, the logical identifier can be determined by each object 26, even though the logical identifier is not included with the persistent information code of the object, by referencing the grid record 31 using the object's placement identifier.

Figure 4:
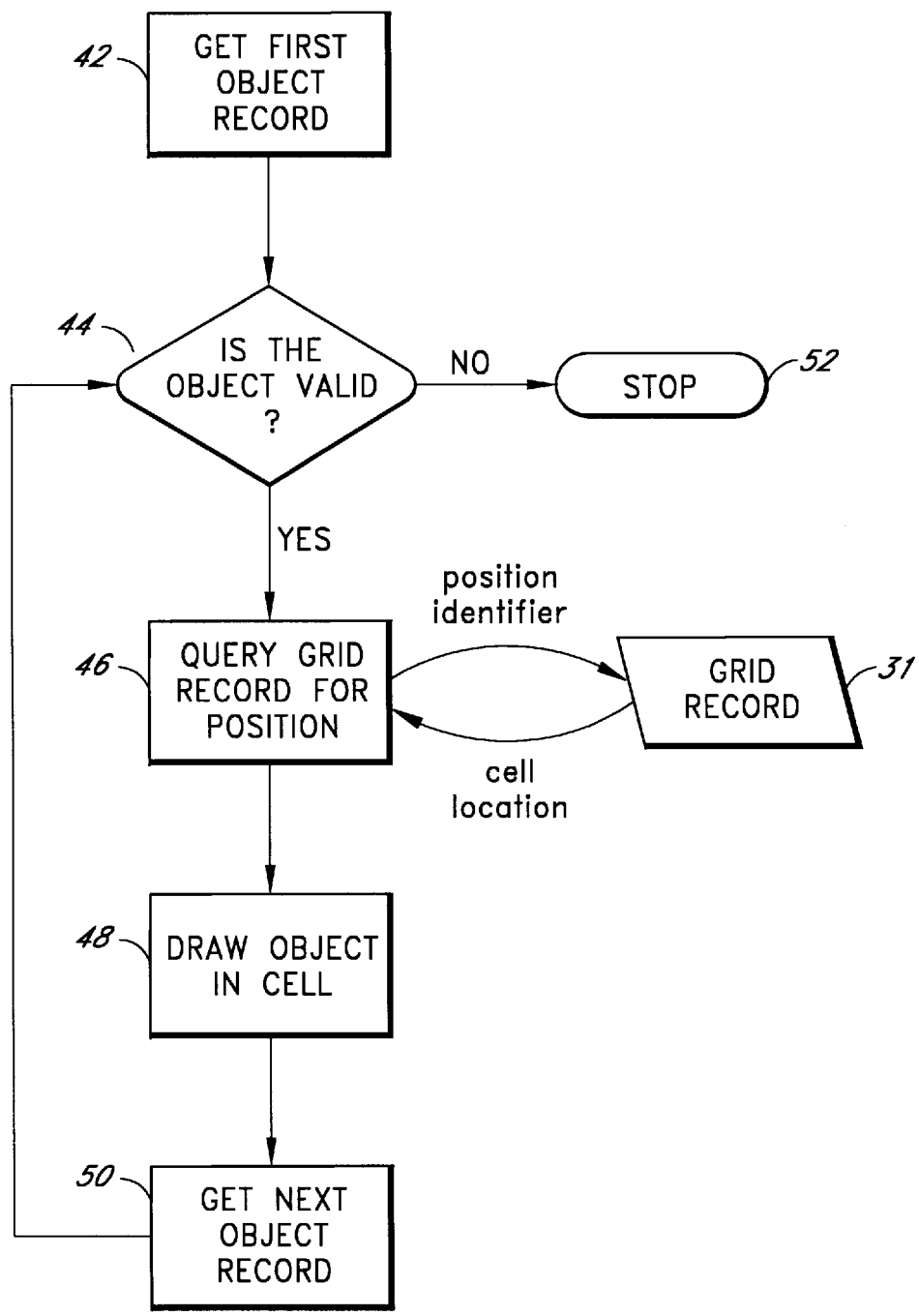
FIG. 4 is a flowchart of a preferred method of operation of the object arrangement method of the present invention.

Referring also to FIG. 4, the objects 26 are arranged inside the container 22 at various times, such as when the CPU 16 initially starts up, or when the grid style of the grid record 31 has been changed. The program 30 calls a method for arranging the objects 26 inside the container 22, the method being designated generally by reference numeral 40. The method 40 is stored as software code inside the program 30 and is executed by the CPU 16. Execution of the method 40 begins with step 42, which searches the grid record's list of pointers for the first pointer to an object. At step 44, a determination is made whether the pointer returned a valid object 26, or if it designates that there are no more objects.

If at step 44, a valid object 26 is returned, execution proceeds to step 46, which queries the grid record 31. This is accomplished by retrieving the placement identifier from the object 26, perusing the grid record 31 for the logical identifier and grid style, and determining the exact position for the object 26. Execution then proceeds to step 48, which draws the object 26 in the position designated by the grid record 31. At step 50, the next object pointer of the container 22 is retrieved and execution loops back to step 44.

If at step 44, a determination is made that there are no more valid objects, execution proceeds to step 52, which terminates execution of the method 40.

It is understood that the present invention can take many forms and embodiments. The embodiments shown herein are intended to illustrate rather than to limit the invention, it being appreciated that variations may be made without departing from the spirit or the scope of the invention. For example, the present invention may be incorporated with graphical objects, like individual chairs, in a graphics application. In so doing, the application can switch between different seating arrangements as grid styles to determine a desired seating arrangement. Therefore, although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A computer operably connected to a display, comprising:
   a computer storage medium which contains a computer program for automatically arranging each of a plurality of objects inside a container for presentation on said display, said program configured to:
      provide a plurality of grid configurations, wherein the grid configurations associate a plurality of container cells with geometric patterns, and wherein at least one of said geometric patterns is a non-rectangular pattern such that at least one of said grid configurations is a non-rectangular grid configuration;
      dynamically select one of said grid configurations as a selected grid configuration, said selected grid configuration selected from said plurality of grid configurations by using a control panel of a graphical user interface;
      arrange the plurality of container cells inside the container according to said selected grid configuration
      associate each of said objects on said display with one of the container cells; and
      place each object to be presented on said display in the associated container cell.

2. The program of claim 1 further comprising:
   accessing a position list of identifiers for each object to be presented on said display;
   accessing a logical list to determine a logical relationship between each object to be presented on said display.

3. The program of claim 2 wherein the position list comprises a unique position for each object to be presented.

4. The program of claim 2 wherein the logical list comprises a unique coordinate for each object to be presented.

5. The program of claim 4 wherein each unique coordinate corresponds to one of the container cells and each coordinate can be logically compared with another coordinate.

6. The program of claim 1 wherein the one grid style arranges the container cells in an organized manner.

7. The program of claim 1 wherein the container is defined by a container code and each of the objects is defined by an object code such that neither the container code nor the object code is altered by the program.

8. The program of claim 7 wherein a new grid configuration can be added without changing either the container code or the object code.

9. A runtime method for arranging a plurality of objects in a desktop view of a graphical user interface, the method comprising:
   selecting at runtime a selected template from a plurality of templates, said template corresponding to a non-rectangularly organized grid configuration;
   arranging a plurality of locations on a desktop in accordance with the selected template;
   associating a position identifier with each of the objects; and
   placing each of the objects in one of the locations, according to the object's position identifier.

10. The method of claim 9 wherein the step of selecting a selected template is done in response to a user input.

11. The method of claim 9 further comprising storing each of the position identifiers in a grid record, wherein each position identifier is unique.

12. The method of claim 9 wherein the grid configuration can be represented by a coordinate system.

13. The method of claim 12 wherein each of the grid styles can be represented by a coordinate system.

14. The method of claim 9 further comprising associating a logical identifier with each of the objects.

15. The method of claim 14 wherein each logical identifier comprises a unique coordinate for each of the objects.

16. The method of claim 15 wherein each coordinate corresponds to one of the locations.

17. The method of claim 9 wherein the grid style can be represented by a mathematical formula.

18. The method of claim 9 wherein each of the objects is unaffected by changes in the grid styles.

19. A computer system for arranging a plurality of objects inside a desktop container of a graphical user interface, the system comprising:
   means for selecting, in response to an input by an end user, one of a plurality of ordered grid styles, wherein at least one of said ordered grid styles is a non-rectangular grid style;
   means for arranging a plurality of locations inside the container in accordance with the selected grid style;
   means for associating a position identifier with each of the objects; and
   means for placing each of the objects in one of the locations, according to the object's position identifier.

20. The system of claim 19 further comprising a record for storing each of the position identifiers, wherein each position identifier is unique.

21. The system of claim 19 further comprising a record for storing each of the grid styles in a grid record.

22. The system of claim 21 wherein each of the grid styles can be represented by a coordinate system.

23. The system of claim 19 further comprising means for associating a logical identifier with each of the objects.

24. The system of claim 23 wherein each logical identifier comprises a unique coordinate for each of the objects.

25. The system of claim 24 wherein each unique coordinate corresponds to one of the locations.

26. The system of claim 19 wherein the grid style is one of either rectangular, rhombus-shaped, or circular.

27. The system of claim 19 wherein the container is unaffected by changes in the grid styles.

28. The system of claim 19 wherein each of the objects is unaffected by changes in the grid styles.

29. The method of claim 9, wherein said selected template comprises a formula.

30. The method of claim 9, wherein said step of selecting a selected template is accomplished through a control panel provided by a graphical user interface.

31. The computer of claim 1, said computer program further configured to:

associate a new object to be displayed on said display with an empty container cell; and place said new object in said empty container cell.

32. The computer of claim 1, wherein said non-rectangular pattern describes an arc.

* * * * *

UNITED STATES PATENT AND TRADEMARK OFFICE
CERTIFICATE OF CORRECTION

PATENT NO. : 5,883,625
DATED : March 16, 1999
INVENTOR(S) : Chris Crawford, et al.

It is certified that error appears in the above-identified patent and that said Letters Patent is hereby corrected as shown below:

In column 6 at line 38, change "wherein the grid configuration can be represented by a coordinate system" to --further comprising storing each of the grid styles in a grid record--.

In column 6 at line 40, delete "each of".

In column 6 at line 41, change "styles" to --configuration--.

Signed and Sealed this

Eighth Day of May, 2001

Attest:

NICHOLAS P. GODICI

Attesting Officer

Acting Director of the United States Patent and Trademark Office